Jan. 9, 1934.   E. F. DAUTEUIL   1,943,208
MACHINE FOR FILLING AND CORKING BOTTLES OF ANY SHAPE AND DIMENSION
Filed Aug. 17, 1931   7 Sheets-Sheet 4

E. F. Dauteuil
INVENTOR

By: Marks & Clerk
ATTys.

Jan. 9, 1934.  E. F. DAUTEUIL  1,943,208
MACHINE FOR FILLING AND CORKING BOTTLES OF ANY SHAPE AND DIMENSION
Filed Aug. 17, 1931  7 Sheets-Sheet 5

E. F. Dauteuil
INVENTOR

By: Marks & Clerk
Attys.

Jan. 9, 1934.  E. F. DAUTEUIL  1,943,208

MACHINE FOR FILLING AND CORKING BOTTLES OF ANY SHAPE AND DIMENSION

Filed Aug. 17, 1931  7 Sheets-Sheet 7

E. F. Dauteuil
INVENTOR

By: Marks & Clerk
Att'ys.

Patented Jan. 9, 1934

1,943,208

UNITED STATES PATENT OFFICE 1,943,208

MACHINE FOR FILLING AND CORKING BOTTLES OF ANY SHAPE AND DIMENSION

Edouard Fernand Dauteuil, Saint-Denis, France

Application August 17, 1931, Serial No. 557,688, and in Germany January 29, 1931

4 Claims. (Cl. 226—76)

This invention has for object a machine for filling and corking bottles of any shape and dimension and ensuring after corking, the discharge of the said bottles.

The machine made according to the present invention essentially comprises a conveyor receiving from any motor, through any suitable transmission, an intermittent circular or rectilinear movement of translation and so arranged as to support the bottles and to successively convey them to suitable devices for effecting their filling, corking and discharge, at the same time as the ejection, upon corking, of the corks which are presented in a defective positon or over broken bottles.

All the filling, corking and ejecting operations are automatically effected, and the machine according to the invention requires, for its operation, but one operator placing the empty bottles in position in suitable housings of the conveyor.

A form of construction of a machine for filling and corking glass tubes will be described hereinafter by way of example only, this machine comprising a conveyor receiving intermittent angular displacements and so arranged as to present, at each period of stoppage, four of these tubes to filling, corking and ejecting devices.

Figure 1:
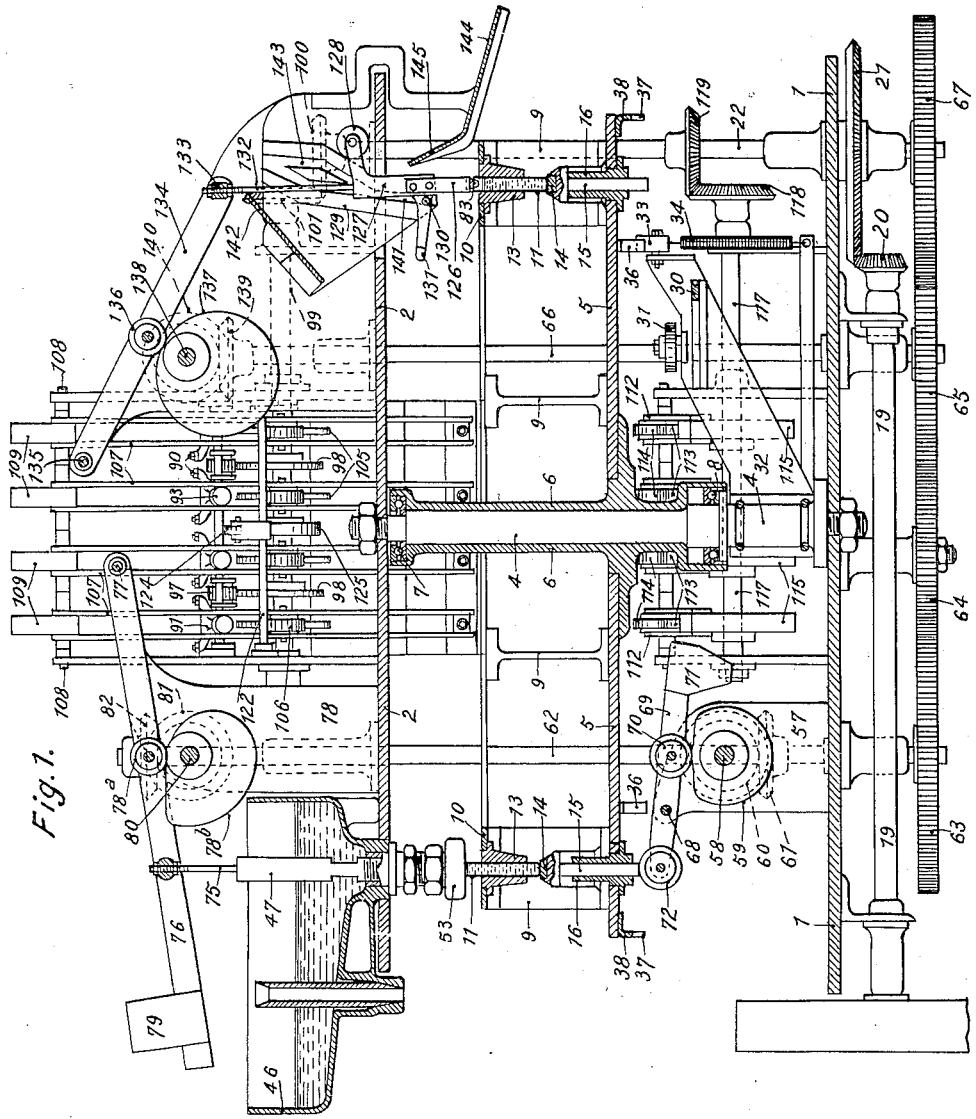
Fig. 1 is a longitudinal vertical section made according to line 1—1 of Fig. 2.

As illustrated in the accompanying drawings, the machine of this invention which, in the example shown, is so constructed as to fill and cork four tubes or other small bottles at the same time, comprises a frame constituted by two horizontal plates 1 and 2 rigidly braced and supported by vertical columns 3.

The lower plate 1 which is of circular shape, carries at its center, a vertical shaft 4 secured, at its lower end, in the plate 1 and, at its upper end, in the plate 2.

Between these two fixed plates 1 and 2 is interposed a third circular plate 5 which is secured on a central hub 6 mounted on the shaft 4 and held on the latter between two ball abutments 7 and 8.

This plate 5, which receives intermittent angular displacements about the fixed shaft 4, as will be explained hereinafter, is connected through the medium of vertical stays 9, to a crown 10 which thus participates in the angular displacements transmitted to the plate 5 which carries it.

This crown 10 which, in the example illustrated, is of octagonal shape, is adapted to support the tubes 11 or other small bottles to be filled up and to convey them, during the intermittent displacements of the said crown, over devices adapted to successively ensure the filling, corking and discharge of the said tubes 11.

This crown 10 is provided, in each of its sides, with circular recesses 12 in which the tubes 11 or other small bottles, are placed by hand, with the opening turned upwards, between the ends of radial blades 13 projecting within the recesses 12 and resting, on their lower ends, on rubber pads 14 secured to the upper ends of rods 15 vertically sliding in guides 16 secured in the plate 5.

Figure 4:
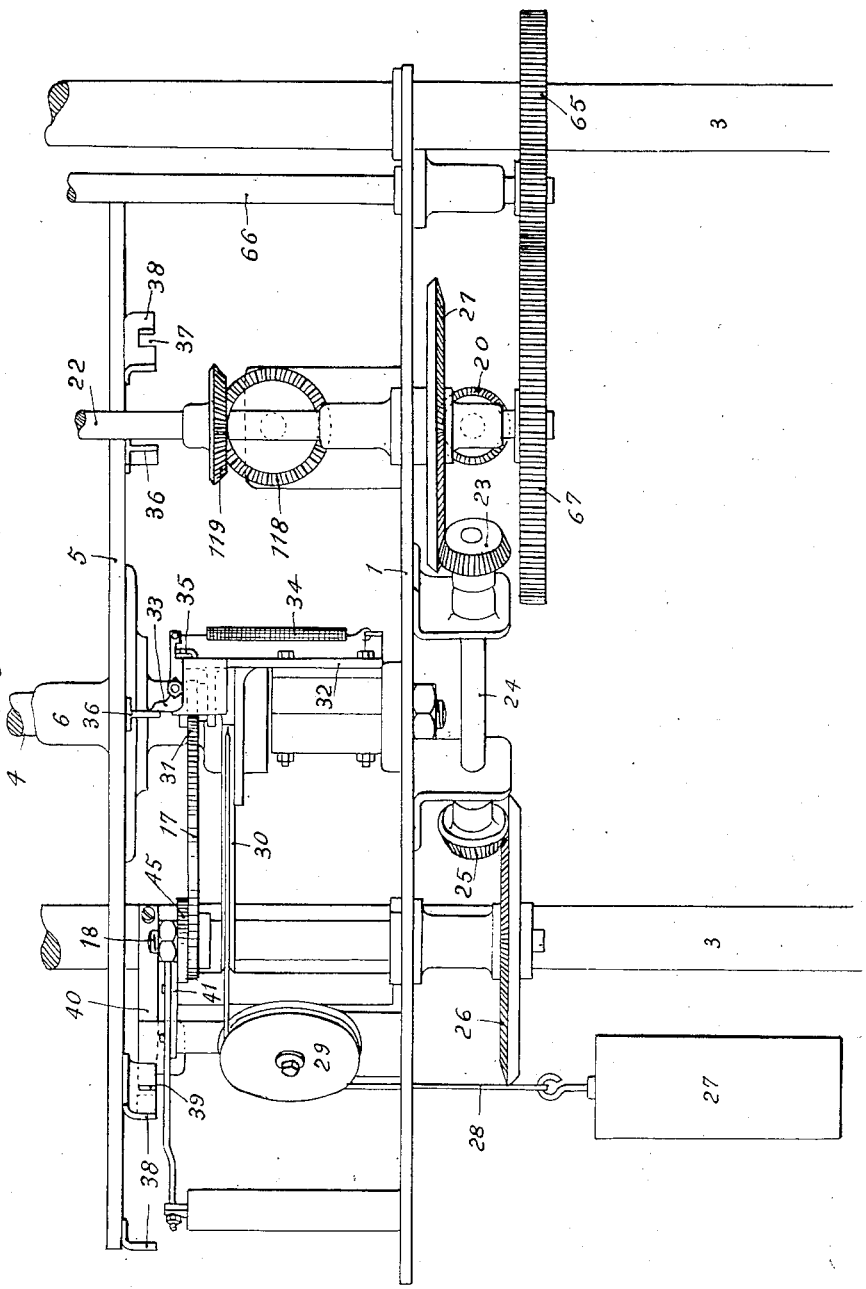
Fig. 4 is a partial elevation showing in detail the device controlling the intermittent angular displacements of the conveyor.
Figure 5:
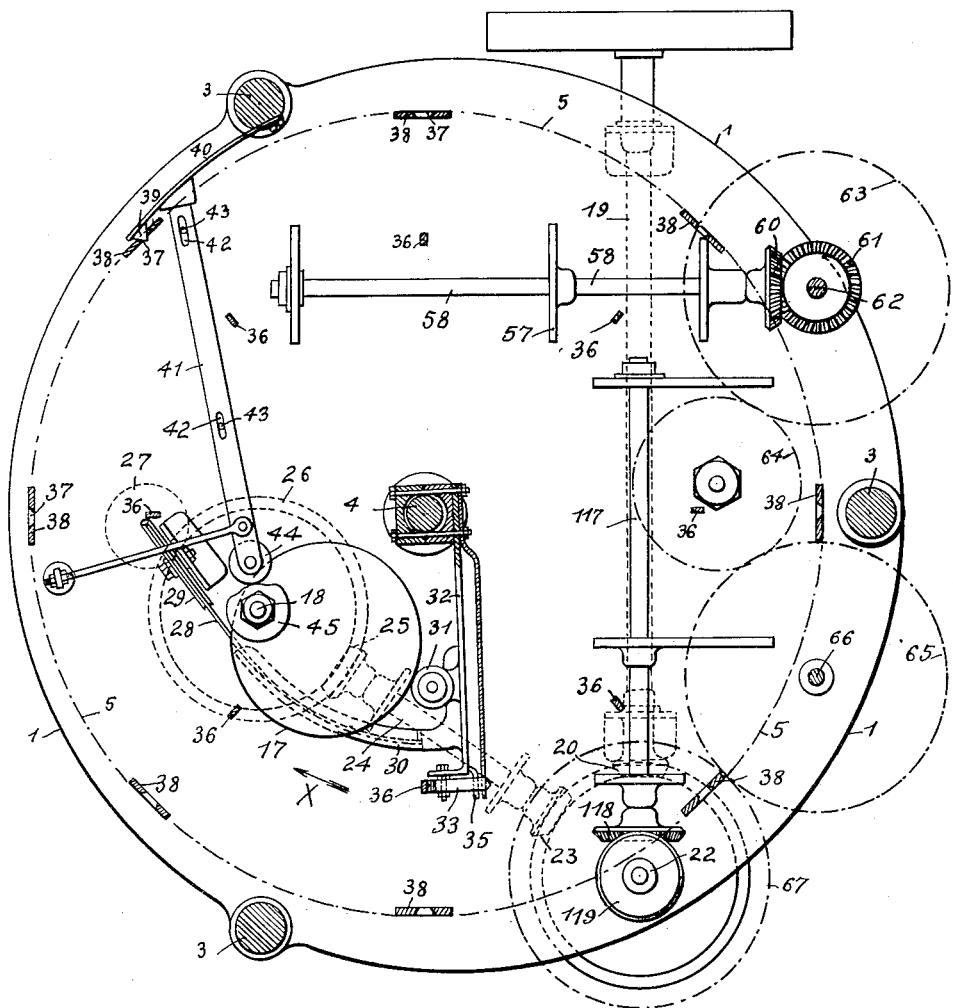
Fig. 5 is a horizontal section of this device.

The intermittent angular displacements of the plate 5 and, consequently, of the crown 10 driving the tubes 11, are controlled, as illustrated in Figs. 4 and 5, by an eccentric 17, rigidly secured on the upper end of a shaft 18, journaled in the fixed plate 1 and receiving a continuous rotary movement from the main driving shaft 19 of the machine through the medium of a bevel gear transmission comprising a pinion 20 rigid with the shaft 19 and meshing with a toothed wheel 21 which is rigidly secured on a shaft 22 and also meshes with a pinion 23 rigid with a shaft 24 provided with a second pinion 25, meshing with a toothed wheel 26, fast on the lower end of the shaft 18 carrying the eccentric 17.

Against this eccentric is held and pressed, under the action of a weight 27 hung from a cable passing on a pulley 29 and attached to a sector 30, a roller 31 carried by an arm 32 freely rocking about the fixed central shaft 4 of the machine.

To the free end of this arm 32 is pivoted a pawl 33 which, under the action of a spring 34, is normally held in the position shown in Fig. 4 in which the tail of the said pawl bears against an abutment 35 of the arm 32, so that the nose of this pawl will be lifted to engage with one of the driving tappets 36 secured under the lower face of the plate 5.

The latter is held stationary, upon each period of stoppage, by engagement in an opening 37 of one of the locking tappets 38 of the plate 5, of a locking member constituted by a stop tooth 39 secured to one of the ends of a spring blade 40 attached at its other end to one of the columns 3 of the frame.

Referring to Figs. 4 and 5, it will be seen that, when the plate 5 and the crown 10 are held stationary by the locking member 39, the roller 31 is in contact with the portion of largest diameter of the eccentric 17, so that the arm 32 is restored, by the said eccentric, to its rear position against the action of the weight 27 which is lifted and that the nose of the pawl 33 is in contact with one of the driving tappets 36 of the plate 5.

It will also be seen in Figs. 4 and 5 that the spring blade 40 of the locking member 39 carries an arm 41 which, fitted through a slideway 42 on a guide stud 43 fixed in position, is provided, at its free end, with a roller 44 which is held in contact, by the spring 40, with a cam 45 fast on the upper end of the shaft 18.

From the foregoing, it will be understood that the rotation of this shaft 18 has for effect to drive the cam 45 and the eccentric 17. The cam 45 thus pushes the sliding arm 41 against the action of the spring 40 and ensures, consequently, the unlocking and release of the plate 5 and of the crown 10 which is rigid therewith; this unlocking is maintained as long as the roller 44 is in contact with the portion of largest radius of the cam 45.

On the other hand, the eccentric 17, during its rotation, presents, to the roller 31 of the lever 32, points of contact which are progressively nearer to the center of the shaft 18, so that this lever 32 which is loosely mounted on the fixed shaft 4 and returned by its weight 27, angularly moves under the action of the latter, about the said shaft 4 in the direction of the arrow $x$, Fig. 5. This lever 32 drives, through the medium of the pawl 33, the plate 5 and the crown 10 in the same direction $x$, until the said plate 5 is again automatically stopped at the end of the revolution of the shaft 18, by the locking member 39, the eccentric 17 moving the arm 32 backwards to the position shown in Figs. 4 and 5, and the pawl 33 carried by this arm 32, rocking in order to pass under the next tappet 36 and rising as soon as it has passed the latter, in readiness to again actuate the plate 5.

Figure 2:
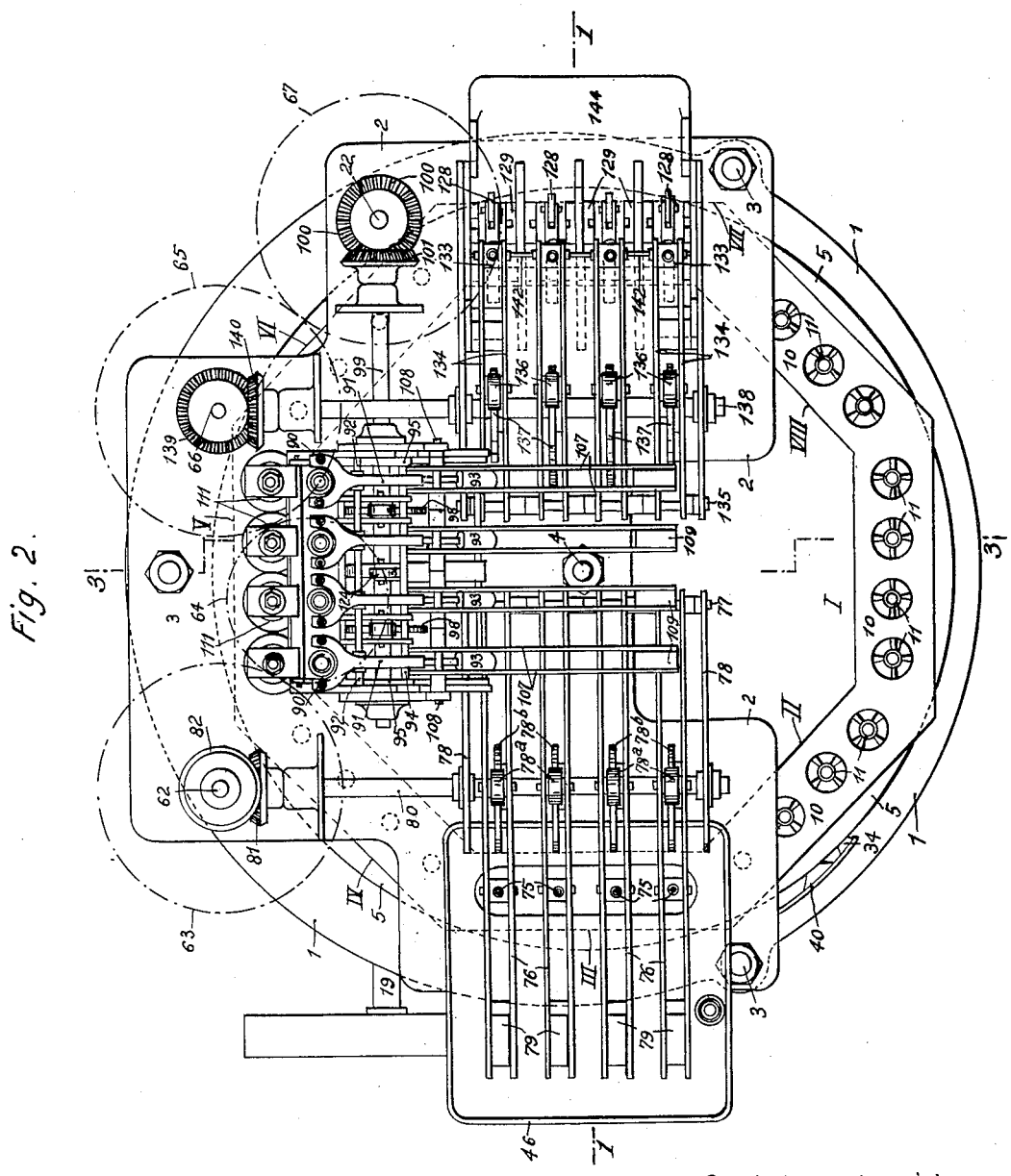
Fig. 2 is a plan view.

In each position of stoppage of this plate 5, the crown 10 which is rigid therewith occupies as shown in Fig. 2 such a position that one of the sides I of the said crown is located opposite the operator who has to introduce, in the recesses of this side, the empty tubes 11 or other vessels.

This crown 10 having, in the example shown, an octagonal shape, the plate 5 which carries it receives, upon each revolution of the shaft 18, an angular displacement of 45°, so that the side I of the said crown, during each revolution of the plate 5 and upon each period of stoppage, successively occupies the place of the sides II to VIII of the said crown before being restored to the position shown at I, Fig. 2.

In the position of stoppage shown in this figure, the four tubes 11 placed in the recesses of the side III of the crown 10 and supported by the rods 15, are empty, as those of the side II, but come under the filling device.

Figure 6:
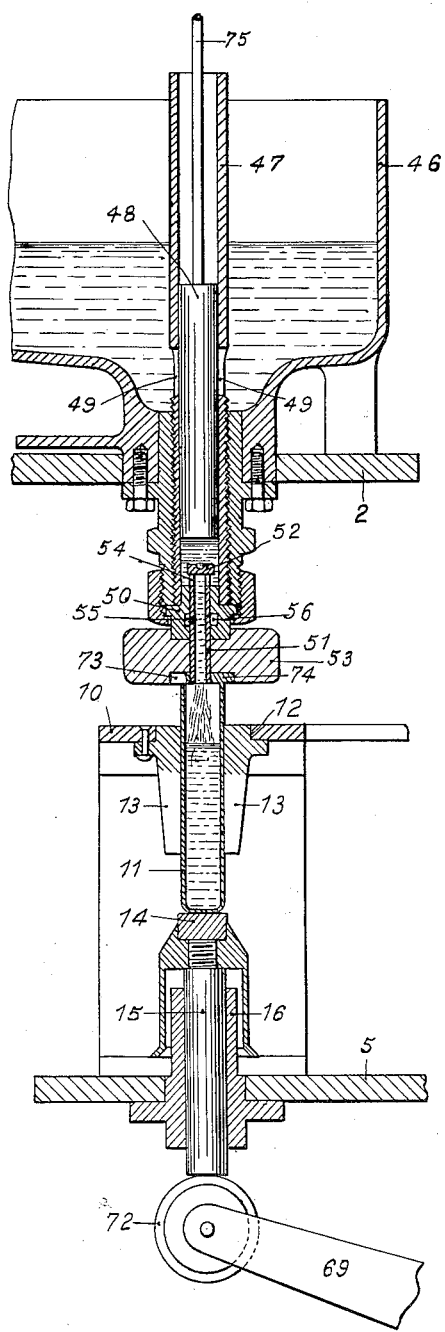
Fig. 6 shows in detail and in vertical section the filling device.

This filling device is constituted by a vessel 46 containing the liquid, semi-liquid or pasty product to be introduced in the tubes 11, and is secured on the upper plate 2 of the machine. Within this vessel 46, which is fed by any suitable means, are arranged four pumps, the outflow of which is adjustable and each comprising, as shown in Fig. 6, a cylinder 47 within which a piston 48 receives a vertical reciprocating movement.

Each pump barrel 47 is perforated, near the bottom of the vessel 46, with openings 49 putting the said pump barrels in communication with the vessel 46, and is provided, at its lower end, with a plug 50 perforated at its centre with a vertical channel in which is guided, by its hollow rod 51, a delivery valve 52 normally pressed against the upper edge of the plug 50 by a weight 53 secured on the valve rod so as to close the pump barrel.

The valve 52, arranged at the base of each pump barrel, is vertically movable in the plug 50 which carries it, so as to control the issue of the product contained in the vessel 46. For that purpose, the hollow rod 51 is perforated with openings 54 which, as illustrated in Fig. 6, are uncovered when the weight 53 and, consequently, the valve 52 is lifted and to allow the product to flow out through the hollow rod 51; the said openings 54 being closed when the weight and the valve are in their lower position, so as to close, in this position, the pump barrel corresponding to the said valve.

The rod 51 of this valve is, moreover, perforated with orifices 55 which, when the valve is open, are located opposite a circular groove 56 formed in the plug 50 and the function of which will be hereinafter explained.

The four empty tubes 11 which, upon each period of stoppage of the plate 5, come exactly underneath the four pump barrels 47 and rest on their bottom ends on resilient buffers 14 of the rods 15, are filled in the following manner:

Under the plate 5 carrying the rods 15, is mounted, in supports 57 secured on the lower plate 1 of the frame, a shaft 58 carrying four cams 59 and a pinion 60, meshing with another pinion 61 carried by a vertical shaft 62.

At its lower end, this shaft 62 is provided with a toothed wheel 63 gearing with an intermediate gear wheel 64 meshing with a gear 65 carried by a vertical shaft 66 receiving from the shaft 22 driven by the main driving shaft 19, a continuous rotary movement, through the medium of the toothed wheel 67 rigid with the said shaft 22 and meshing with the toothed wheel 65 of the shaft 66.

Above the shaft 58 are pivoted, about a stud 68 secured in the supports 57, four levers 69 so arranged as to be respectively actuated by the four cams 59 of the said shaft 58.

Each of these levers 69 which is provided, at a certain point of its length, with a roller 70, and carries, at one of its ends, a weight 71 and, at its other end, a second roller 72.

The four rollers 72 are arranged exactly under the rods 15 and the four rollers 70 are arranged above the four cams 59 of the shaft 58 and are, constantly, held in contact with the said cams by the weights 71 loading the levers 69.

The profile of these cams 59 and their position on the shaft 58 are so determined that, during the periods of angular displacement of the plate 5, the rollers 70 of the levers 69, as well as the weights 71 of the said levers, are lifted and that the other rollers 72 are, from this fact, lowered below the bottom of the tubes 11 to be filled, whilst upon each period of stoppage of the plate 5, the cams 59 each presents its portion of smallest radius opposite the rollers 70, so that the latter are lowered by the weights 71, at the same time as the rollers 72 rise and act on the pushpieces or rods 15.

The latter, under the action of the weights 71, rise and push upwardly the tubes 11 which, during their lifting movement, encounter the weight 53 located above each of them and thus determine the opening of the valve 52 closing each pump barrel (Fig. 6).

It is to be noted that the weights 53 loading the valves 52 are each provided, on their inner face, with a recess 73 serving as a housing for a packing 74, made of resilient material, against which fits the open end of the tubes 11; this packing does not however entirely cover these tubes, as clearly shown in Fig. 6, so as to allow at the time of filling the tubes, the escape of the air contained in the latter.

This filling operation is effected by the operation of the pistons 48 mounted in the pump barrels 47 and the rods 75 of which are attached, at their upper ends, to lever arms 76 which are pivoted at 77 in supports 78 secured on the upper plate 2 and are each provided with a roller 78$^a$ and a weight 79, secured at the end opposite to the pivoting point 77 and thus maintaining the roller 78$^a$ of each lever 76 in contact with the cam 78$^b$.

These four cams 78$^b$ are rigidly secured on a shaft 80 journalled in the supports 78 and receiving a continuous rotary movement, through the medium of bevel pinions 81 and 82 respectively secured on the said shaft 80 and on the shaft 62.

During the periods of angular displacement of the plate 5, the pistons 48 of the pumps 47 are lifted by the portion of largest radius of the cams 78$^b$, so that their base comes above the orifices 49 of the pump barrels and the product contained in the vessel 46 may thus flow into the said pump barrels which are closed, during these periods of displacement, by the valves 52, as explained above.

During the periods of stoppage of the plate 5, the cams 78$^b$ present to the rollers 78$^a$ of the levers 76, their portion of smallest radius, so that, under the action of the counterweights 79, these levers lower, determining the descent of the pistons 48 and, consequently, the delivery in the tubes 11 of the product contained in the pump barrels 47, the valves 52 of which have been opened, as explained above.

As these valves 52 must be able to move freely in their respective plugs 50, owing to the slight play or clearance existing between each plug and the hollow rod 51 of the corresponding valve, a drop of the product falls down the said rod, during its lifting, into the groove 56 of the plug.

This drop is retained in this groove by the partial vacuum generated in the latter upon upward movement of the piston, and thus cannot escape to the exterior and soil the tubes 11, but it is introduced into the latter when the pistons 48 move down, after the opening of the valves 52.

The stroke of the pistons 48 being adjusted according to the capacity of the tubes 11 to be filled, the group of tubes the filling of which is terminated, is angularly moved according to one-eighth of a revolution as already explained, and the side III of the crown 10 comes into the place of the side IV.

The side IV lined with tubes 11 filled up during the preceding operation and lowered between the fins of the recesses of the crown 10 by the downward movement of the weights 53 closing the valves 52, then comes to V where the corking operation is effected.

The corks 83 employed in the machine are of conical shape and arranged on each other in hollow vertical columns 84 the number of which corresponds to that of the tubes 11 to be corked.

Figure 3:
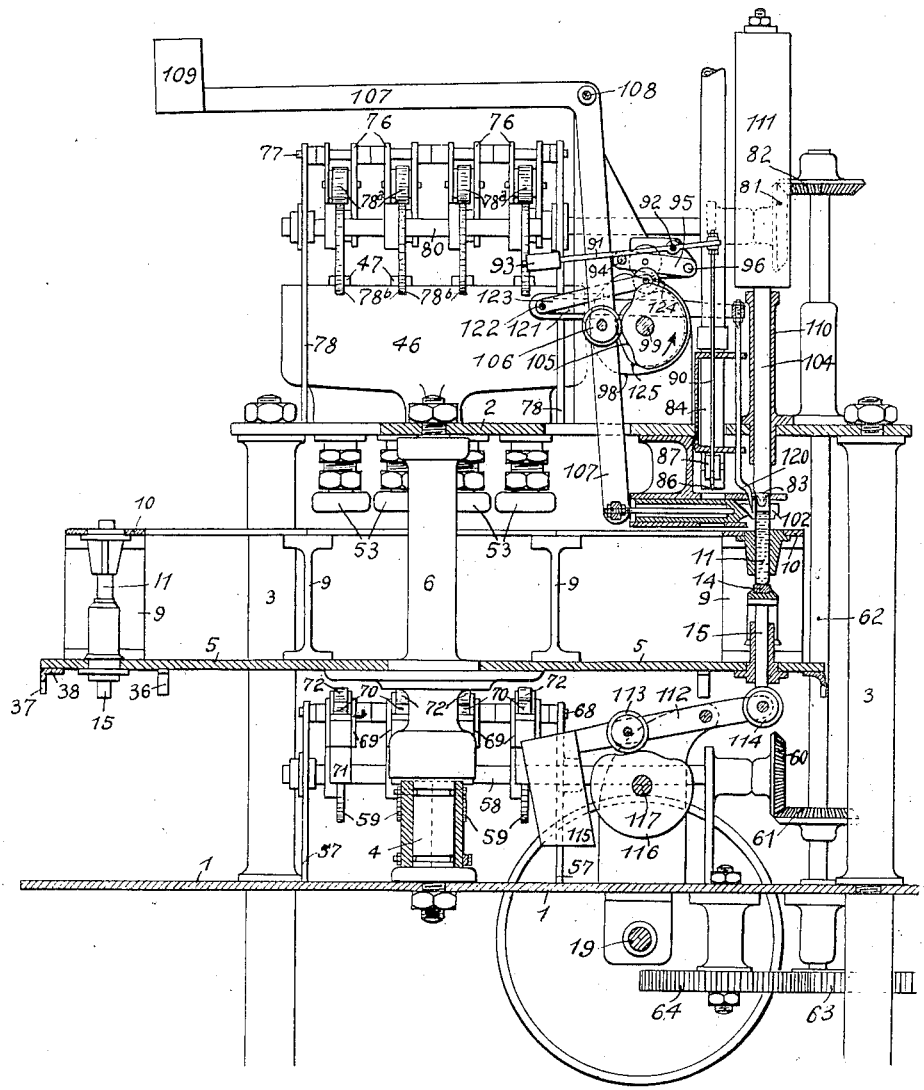
Fig. 3 is a cross vertical section made according to line 3—3 of Fig. 2.
Figure 7:
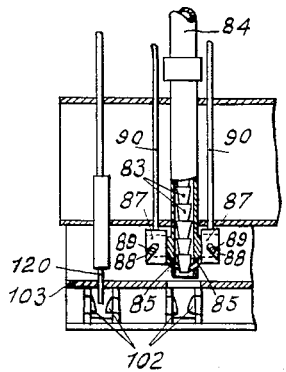
Figs. 7 and 8 are two detail views showing one of the claws controlling the distribution of the corks to the clips conveying the latter to the corking members, and one of the cork ejectors combined with the said clip.
Figure 8:
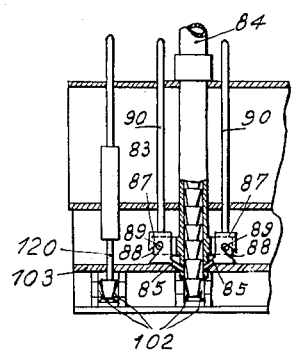

Each column 84 is provided, at its base, with a claw constituted by two fingers 85 which enter vertical slots 86 in each column and embrace the lowermost cork so as to maintain, in each of these columns, the corks it contains in a suspended condition, as shown in Figs. 3, 7 and 8.

Referring to these figures, it will be seen that the fingers 85 of each claw are rigid with slide-blocks 87 which are fitted, through an inclined slot 88, on fixed pins 89 and, through the medium of rods 90, are hung from levers 91 pivoted at 92 on the frame and loaded at their free end with a weight 93 tending to raise the rods 90 and to lift the pile of corks contained in each column 84.

The levers 91 rest, at a certain point of their length, on a cross member 94 secured at one of the ends of arms 95 which are pivoted at 96 on the frame and are provided with a roller 97 held in contact, by the weights 93, with two cams 98 rigidly secured on a shaft 99 which receives its movement of rotation from the shaft 22, by means of a bevel pinion 100 fast on the said shaft 22 and meshing with another bevel pinion 101, rigid with the shaft 99.

Both cams 98 are adapted to control, against the action of the weights 93, the lowering of the rods 90 and, consequently, of the two slide-blocks 87 secured at the lower end of the said rods and provided with the fingers 85.

During their downward movement, both slide-blocks 87 guided by their slide 88 on the fixed pins 89, move away from the columns 84 and determine the opening of both fingers 85, as illustrated in Fig. 8.

This action has for its effect to release each pile of corks contained in the columns 84 and to allow the corks located at the base of each pile, to fall between the two spring branches with a conical housing, of a pair of pincers 102 arranged under each column 84 and longitudinally movable in a guide 103 for bringing the said cork to the corking member 104.

As soon as the lowermost cork 83 of each column is received by the pair of pincers 102 corresponding to this column, the weights 93 lower, the rollers 97 being at this moment in contact with the portion of small radius of the cams 98 and determining the rising of the slide-blocks 87 to the position shown in Figs. 3 and 7, in which the fingers 85 again embrace the lowermost cork of each pile and raise the latter.

The shaft 99 carrying the cams 98 controlling the opening of the claws 85 and the ejection of a cork in each transferring pair of pincers 102, is also provided with a second series of cams 105 against each of which is pressed a roller 106 of levers 107, which pivoted at 108 on the frame, are respectively connected to the pairs of pincers 102 and are loaded with a weight 109.

These cams 105 are so shaped as to return, through the medium of the levers 107 provided with weights 109, the pairs of pincers 102 under each column 84 in suitable position for receiving the lowermost cork of the said columns, the said cams presenting, opposite the rollers 106, their portion of smallest radius at the time the claws 85 move upward, in order to allow, at this moment, the levers 107 to be actuated by their respective weights 109 and to determine, by the displacement of the pairs of pincers 102 in their guides 103, the feeding of the corks 83 delivered by the columns 84 under the corking members, as above stated. These corking members are constituted by pistons 104, the vertical axes of which are exactly in alignment with that of the filled up tubes 11 and of the corks 83 interposed between the orifices of the said tubes and the base of the pistons 104. The latter are so mounted as to be capable of sliding freely in guide sockets 110 and are loaded, at their upper ends, with heavy bodies 111.

When the corks 83 have been moved by the pairs of pincers 102 above the filled tubes 11 placed under the pistons 104, these tubes, which normally rest on the resilient buffers 14 of the corresponding push-pieces 15, are lifted, as shown in Fig. 3, so as to engage their open upper ends on the said corks which, maintained by the pairs of pincers 102, thus bear, by their upper faces, against the bases of the pistons 104 which they lift by entering the tubes 11.

This lifting of the tubes 11 is controlled, exactly as for the filling operation, by means of levers 112 which are provided, at points of their lengths, with rollers 113 and carry, at one of their ends, other rollers 114 and, at the other ends, weights 115, which hold the rollers 113 in contact with the corresponding cams 116 of a shaft 117 receiving its movement of rotation from the shaft 22, by means of bevel pinions 118 and 119, the pinion 118 being rigid with the shaft 117, and the pinion 119 being rigid with the shaft 22.

The cams 116 are so shaped and secured on the shaft 117 as to maintain the weights 115 lifted during the intermittent displacements of the plate 5 and to present their portion of smallest radius opposite the rollers 113, at the time the pairs of pincers 102 have brought, under the pistons 104, the cork 83 embraced by the resilient branches of the said pincers, in order to obtain, by the release of the weights 115, the lifting, by the rollers 114 of the levers 112, of the filled tubes and the corking of the latter, as above explained.

During the insertion of the corks 83 in the tubes 11, the pincers 102 are returned, by the action of the cams 105, under the columns 84, and are thus in suitable position for receiving a new cork.

At the moment these corks place themselves in the pincers 102, the piles of corks are lifted, as above explained, by the action of the claws 85, in order to maintain the last cork of each pile in the vertical position and to allow the free displacement of the pincers.

Above each pair of pincers 102, is mounted a finger 120 which, receiving a vertical reciprocating movement, is so arranged, at the end of its downward stroke, as to pass between the branches of each pair of pincers 102 when the latter have moved their cork 83 under the piston 104 and to eject the said cork from the branches of the said pincers during the return movement of the latter, in case the cork is presented in a defective position, or in case the tube to be corked is broken.

These fingers 120 are each rigid with a rod by means of which they are hung from levers 121 fast on a shaft 122 journalled in the frame and carrying an arm 123 provided with a roller 124 in contact with the cam 125 rigidly secured on the shaft 99 and controlling the vertical reciprocating movements of the fingers 120.

After corking, the plate 5 is again caused to rotate according to one-eighth of a revolution, so as to bring the side V of the crown 10 lined with corked tubes in the place of the side VI which is presented with the filled and corked tubes it carries, at the place of the side VII of the said crown, under the devices ensuring the ejection of the said tubes.

Figure 9:
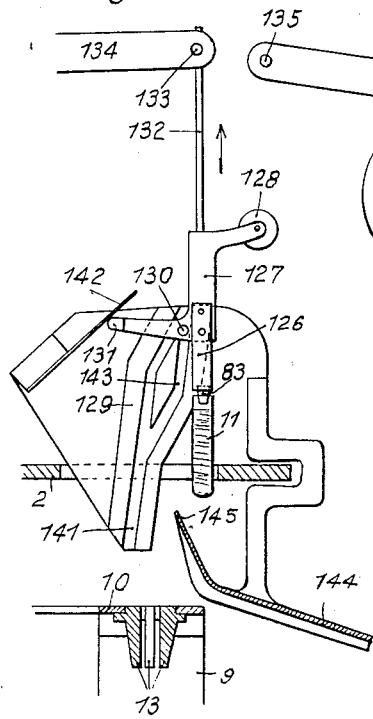
Figs. 9 and 10 show in detail the device ensuring the ejection of the tubes correctly filled up and corked.
Figure 10:
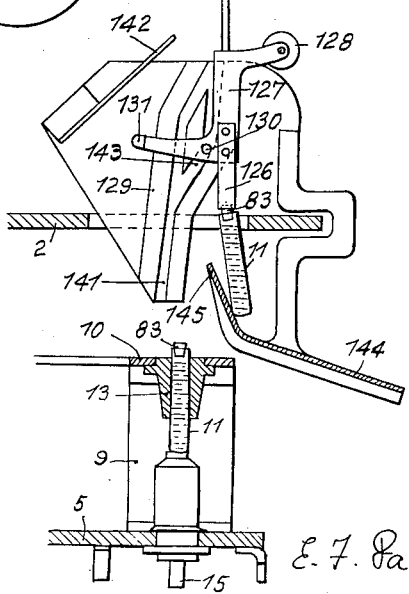

These ejectors are each constituted, as shown in Figs. 9 and 10, by spring claws 126 which are mounted exactly above the tubes 11 held lifted by the push-pieces 15, and are so arranged as to receive a vertical reciprocating movement, for grasping the end of the cork projecting above each tube, lifting the said tubes, and extracting them from the crown 10.

Each claw 126 is secured on a kind of carriage 127 which is provided with a weight 128 and is in engagement with a switching device 129 by means of a pin 130 secured in an arm 131 of the said carriage.

Each carriage 127 is secured to a rod 132 pivoted at 133 on one of the ends of a lever 134 pivoted at 135 on the frame and carrying a roller 136.

These levers 134 are held in contact by their respective roller 136 with cams 137 fast on a shaft 138 journalled in the frame and receiving its movement of rotation from the shaft 66, by means of bevel pinions 139 and 140 respectively fast on the shafts 66 and 138.

The claws 126, being lowered, as shown in Fig. 1, they embrace between them the cork 83 closing each tube 11. During the upward movement imparted by the cams 137 to the said claws, the latter are guided in the slide 141 of the switching device 129 by the pin 130, until the end of the arm 131 of each carriage carrying the said pin comes in contact with a spring blade 142 and pushes the said carriage towards the slide 143 of the switching device, as shown in Fig. 9.

Referring to this figure, it will be understood that, during the first portion of their upward stroke, the claws, 126, have lifted, above the crown 10, the various corked tubes 11 embraced between the said claws and, that, at the end of this upward movement, the carriages 127, pushed back by the spring blades 142, have rocked about their suspension axis 133 and have transferred the tubes 11 above a chute 144 adapted to ensure their discharge.

During their downward movement, determined by the weights 128, the carriages are guided, by the pins 130, in the slides 143 of the switching devices, so that at a certain point of their downward movement, the tubes 11 encounter the raised ends 145 of the chute 144 on which they rock by releasing themselves from the claws 126, as shown in Fig. 10.

The arrangements above described are, of course, given by way of example only, and it is obvious that, without departing from the scope of the invention, the machine might be used for filling and corking vessels of any shape and dimensions, the said vessels being automatically and successively conveyed to the filling, corking and ejecting devices, by a conveyor receiving an intermittent movement which, instead of being circular as described, might be rectilinear, this conveyor being so constructed as to receive a number of vessels greater or smaller than that indicated in the form of construction described.

I claim:

1. A machine for filling and corking bottles comprising a frame composed of upper and lower fixed plates, a horizontally disposed rotatable plate between the fixed plates, a crown carried by the rotatable plate and provided with bottle receiving compartments, a superimposed filling mechanism on the frame occupying a fixed stationed position, a superimposed corking device occupying a second fixed stationed position, a bottle ejecting mechanism occupying a third fixed stationed position, bottle lifting devices situated below on the lower plate and beneath the rotatable plate for cooperating with the filling and corking devices, weighted levers associated with the filling, corking, ejecting and bottle lifting mechanisms, cams for periodically actuating the levers, and cam controlled means for intermittently rotating said plate and crown when the said mechanisms are inoperative.

2. Apparatus as claimed in claim 1, wherein a plurality of filling, corking and ejection devices are arranged in corresponding stationed positions and wherein the crown on the rotatable plate is of octagonal configuration with each portion having a number of bottle receiving compartments corresponding to the number of devices situated at each stationed position, and one portion opposite the corking mechanism being free to permit of the manual arrangement of the bottles in the compartments by an attendant.

3. Apparatus as claimed in claim 1, wherein a main drive shaft is employed, shafts for supporting the cams, other shafts in geared connection with the cam shafts which operate the bottle raising and filling mechanisms and the bottle raising and corking mechanisms, gearing between one of the cam operating shafts and the drive shafts, and other gearing interconnected between said second mentioned shafts.

4. Apparatus as claimed in claim 1, including mechanism situated adjacent the corking mechanism for ejecting the corks upon the accidental breaking of a bottle, and means operably connecting said latter mechanism with the cam operating mechanism of the corking mechanism.

EDOUARD FERNAND DAUTEUIL.